United States Patent [19]

Lightner

[11] Patent Number: 4,457,033

[45] Date of Patent: Jul. 3, 1984

[54] ADJUSTABLE COMBINATION LAWN MOWER TOOL

[76] Inventor: Theodore P. Lightner, Box 712, Smithville, Tex. 78957

[21] Appl. No.: 435,561

[22] Filed: Oct. 21, 1982

[51] Int. Cl.[3] .......................... B25B 13/48; B25F 3/00; B23P 19/04

[52] U.S. Cl. .......................................... 7/138; 81/90 C; 81/177 A; 29/217; 29/264; 29/267

[58] Field of Search ........................... 7/138, 166, 170; 81/177 A, 90 R, 90 C; 29/214–218, 256, 264, 267; 269/249

[56] References Cited

U.S. PATENT DOCUMENTS 1,196,703 8/1916 Kraut .
1,358,530 9/1920 Dean .................................... 29/214
1,360,891 11/1920 Court .
1,600,641 9/1926 Marston et al. .
1,900,314 3/1933 Strom .
2,205,979 6/1940 Horechney .
2,965,958 12/1960 Gribble .
3,010,192 11/1961 Rufer et al. .
3,021,651 2/1962 Fuller et al. .................... 51/241 VS
3,089,286 5/1963 Ulrich .
3,599,311 8/1971 Ellis .
4,103,378 8/1978 Grandos .
4,104,935 8/1978 Stoops ............................. 81/177 A
4,315,339 2/1982 Lightner ................................ 7/138

*Primary Examiner*—James G. Smith
*Attorney, Agent, or Firm*—Roylance, Abrams, Berdo & Goodman

[57] ABSTRACT

An adjustable combination tool forming a C-clamp, a valve pulling device for valves in small gasoline engines, a wrench for turning starter clutch housings in such engines and a device for removing flywheels from such engines. The tool comprises a first bar, a second bar selectively positioned parallel or perpendicular to the first bar, an angle iron positioned perpendicular to the first bar, a projection at one end of the first bar, and a threaded bolt with an enlarged end threadedly carried by the second bar. A device for valve grinding is carried by the threaded bolt and acts as its handle.

10 Claims, 9 Drawing Figures

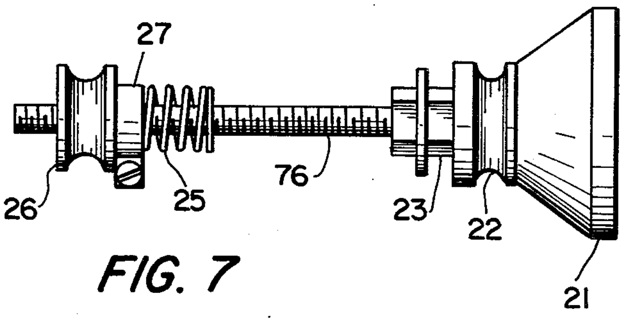
FIG. 7
FIG. 8
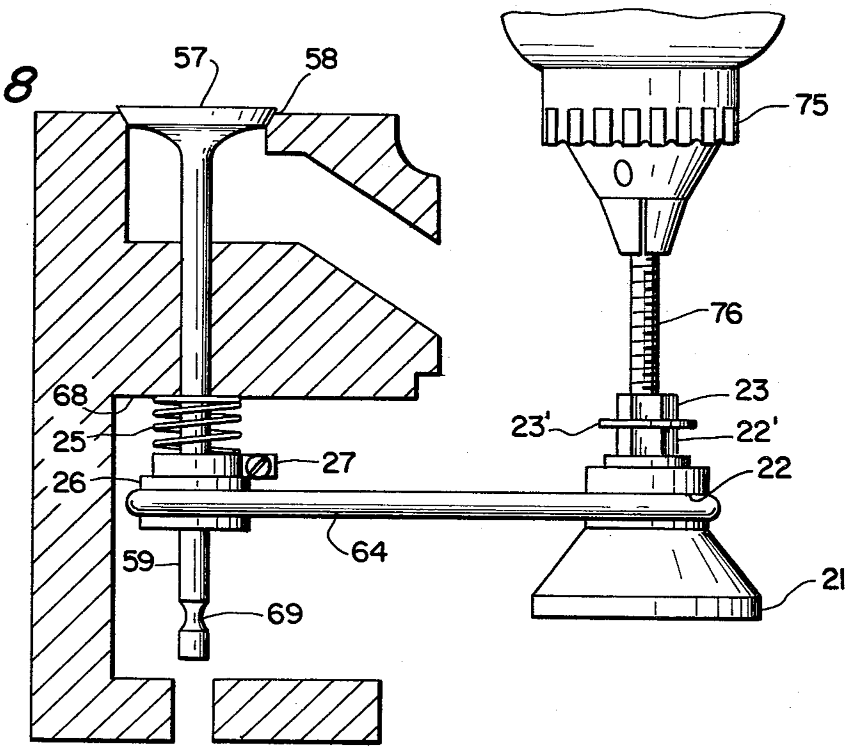
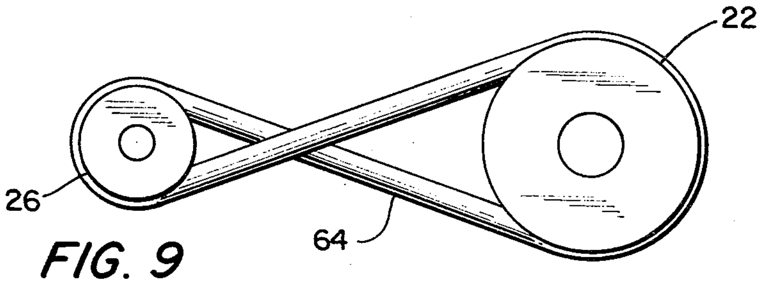
FIG. 9

ADJUSTABLE COMBINATION LAWN MOWER TOOL

FIELD OF THE INVENTION

This invention relates to a combination tool for use in performing maintenance tasks on a machine such as a lawn mower engine, and discloses a device which is an improvement on the tool described in U.S. Pat. No. 4,315,339, issued Feb. 16, 1982, the disclosure of which is hereby incorporated by reference.

The tool is used as a wrench to remove starter clutch housings, as a flywheel puller, as a valve remover, as a valve grinder and as an adjustable C-clamp.

BACKGROUND OF THE INVENTION

Four separate tools can be bought to provide the devices and perform the functions of the present invention; however, they are expensive and sometimes hard to locate, especially far from large cities. This makes lawn mower engine maintenance difficult and expensive for the do-it-yourself mechanic.

Moreover, my present invention specifically improves upon my prior invention in U.S. Pat. No. 4,314,339 by providing a C-clamp structure that was previously undisclosed, by allowing three-holed flywheels to be pulled, by making the tool more easily adjustable and stronger, and by improving valve grinding.

For wrench use the present combination lawn mower tool remains essentially the same as shown in U.S. Pat. No. 4,315,339. Thus, the protruding bolt again acts as a post to fit against the offset on the starter clutch housing. However, the rectangular bar as shown in U.S. Pat. No. 4,315,339 serving as an extension handle to provide leverage for wrench use is replaced by a stronger section of angle iron.

The section of angle iron newly disclosed in my present invention has four uses:

1. To provide an extension handle for wrench leverage by being secured end to end with the long rectangular bar by using two self threading bolts and nuts.

2. To provide a double thickness of steel for pulling Briggs & Stratton flywheels that carry two holes as shown in U.S. Pat. No. 4,315,339, and also to provide a third section of metal necessary for pulling flywheels that carry three holes.

3. To provide one of three sections to form a three sided C-clamp with a cut out jaw on one end for removing valves.

4. To provide one of three sections to form a three sided C-clamp for general shop use, carrying a pressure washer to line up with threaded torque bolt for clamp use.

For compressing the valve spring for removal or replacement of the valve, my prior patent requires a short section of angle iron measuring 2"×1"×½" welded at the lower end of the long rectangular bar, forming a right angle and extending out to one side of the rectangular bar, thus forming a figure "C" or a three sided clamp. This angle iron carries a thin section of channel iron with a cut out jasw on one end. My present invention replaces the welded angle iron and thin channel iron with a single section of angle iron measuring 6"×1"×1" on each side. Thus, it becomes possible to provide an oval counter sunk cut out jaw designed to fit the valve retainer and valve spring on one end of the angle iron to straddle the valve stem for removal of valves. Likewise, two holes are provided on the opposite side of the angle iron for bolting the angle iron to the long rectangular bar to line up the cut out jaw below a threaded torque bolt for use to provide torque for compressing the valve spring for valve removal.

The present tool may also be used as a C-clamp for general shop use although clamp use is not shown in U.S. Pat. No. 4,315,339. Clamp use is made possible by securing the angle iron and the rectangular bar by using the same self-threading bolts and pressure nuts and wing nuts necessary for other uses. Thus, a pressure washer is provided on one end of the angle iron opposite from the cut out jaw end. Likewise, the angle iron also carries two holes for securing it for clamp use; thus bolting the angle iron to the rectangular bar so that the pressure washer lines up with the threaded torque bolt, thereby allowing the torque bolt to apply pressure for clamp use.

U.S. Pat. No. 4,314,339 shows only the pulling of flywheels carrying two holes such as most Briggs and Stratton flywheels. This patent shows two rectangular bars placed face-to-face to form a double thickness of steel. About midway from each end of the bars, three properly spaced holes are drilled through the bars. Each outside hole carries a self-threading bolt with a nut on each side of the bar. One bolt temporarily carries a ⅝" nut. During flywheel removal, this nut is lightly threaded on top of the crankshaft. Then the center hole is placed on top of the nut and the nut acts as a base for the flywheel puller. In this position the two self-threading bolts line up with holes in the flywheel and the bolts are screwed into the flywheel holes, then the two top pressure nuts are tightened clockwise against the bars until the flywheel moves up.

My present tool for pulling flywheels provided with two holes remains the same as shown in U.S. Pat. No. 4,315,339. The earlier mentioned section of right angle iron replaces the rectangular bar, thus providing more strength because of the two sided construction.

My present tool also provides for pulling flywheels carrying three holes. Therefore, three self-threading bolts and nuts are required. My present tool also provides outside holes that are slotted instead of round to fit a larger variety of flywheels for flywheel pulling.

The section of angle iron welded across the rectangular bar two inches away from the post, forming a right angle on each side of the bar for wrench use as shown in U.S. Pat. No. 4,515,339 is also eliminated. Thus, my present tool replaces the welded section of angle iron with a short section of rectangular bar bolted to the long rectangular bar by two self-threading bolts and two nuts; thereby providing a necessary third self-threading bolt and nut and also a fourth for use as a spare for pulling flywheels carrying three holes.

Likewise, the removable short section of rectangular bar may be used to provide a triple thickness of steel for pulling flywheels that carry three holes.

The same round rubber disc as shown in U.S. Pat. No. 4,315,339 may be used in the same way for grinding valves that are not deep seated; and therefore, easy to spin.

For valves that are hard to spin my present tool provides a pulley and belt arrangement for use with a speed drill or manually.

Therefore, the round rubber disc also carries a rubber pulley and a round rubber belt temporarily wrapped around the pulley; also, a threaded handle bolt carries a small rubber pulley equipped with a metal band and a threaded nut and bolt for preventing the pulley from slipping on the valve stem. The pulley also carries a spring to provide the necessary tension for valve grinding.

SUMMARY OF THE INVENTION

Accordingly, it is an object of the invention to provide an improved low cost combination tool for removing starter clutch housings, pulling flywheels, removing valves, grinding valves and acting as a C-clamp which is especially useful for maintaining lawn mower engines.

The tool basically comprises a first bar, a second bar selectively positioned parallel or perpendicular to the first bar, an angle iron positioned perpendicular to the first bar, a projection at one end of the first bar, and a threaded torque bolt with an enlarged end threadedly carried by the second bar. A device for valve grinding is carried by the torque bolt and acts as its handle.

For use as a valve puller, the second bar and angle iron are positioned perpendicular to the first bar, as seen in FIGS. 1-3.

For use as a C-clamp, the second bar and angle iron are positioned perpendicular to the first bar with a pressure washer on the angle iron aligned with the torque bolt, as seen in FIG. 4.

For use as a wrench for starter clutch housing removal, the second bar remains perpendicular to the first bar while the angle iron is positioned parallel to and extending from the first bar, as seen in FIG. 5.

For use as a flywheel puller, the second bar is positioned parallel to and extending from the first bar and the angle iron is positioned perpendicular to the first bar, as seen in FIG. 6.

For valve grinding, the handle of the torque bolt is removed and used to grind valves, as seen in FIGS. 7-9.

Other objects, advantages and salient features of the invention will be described hereinafter in conjunction with the drawings attached hereto and forming a part of this original disclosure.

BRIEF DESCRIPTION OF THE DRAWINGS

FIG. 7 is a side view of the valve grinding tool separated from the combination lawn mower tool;

FIG. 8 is a longitudinal sectional view showing the spinning of the valve for grinding the valve face and valve seat employing the use of a speed drill 75; and FIG. 9 is a top view of the round rubber belt 64 in position to spin a valve in the opposite direction as recommended for valve grinding.

DETAILED DESCRIPTION OF THE PREFERRED EMBODIMENT

Figures 1, 2, 3:
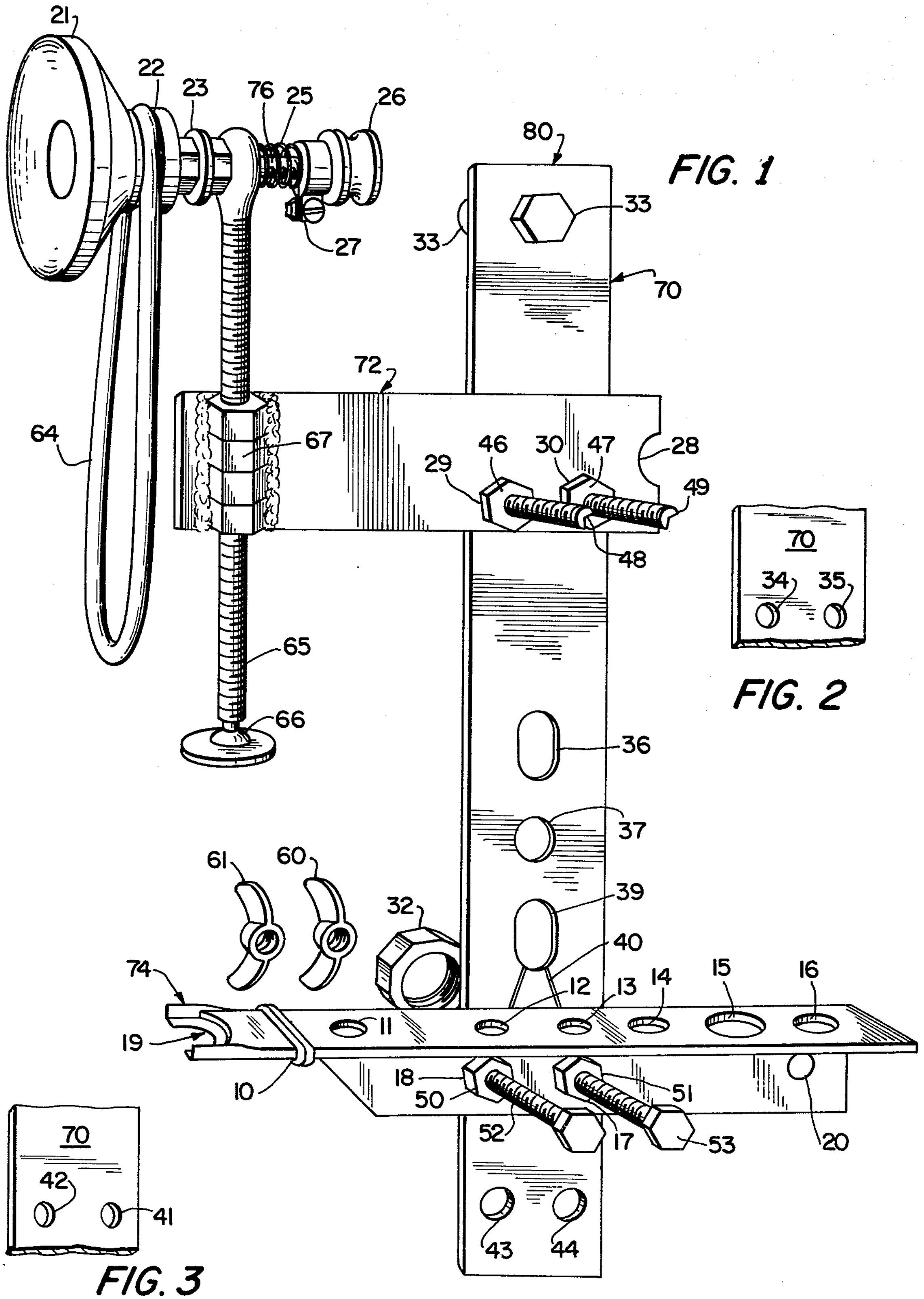
FIG. 1 is a side view of the adjustable combination lawn mower tool showing the tool assembled for removing or replacing valves.
FIG. 2 is a fragmentary side view of section 70 showing location of holes 34 and 35.
FIG. 3 is a fragmentary side view of section 70 showing location of holes 42 and 41.

FIG. 1 shows a side view of the preferred embodiment of the improved combination tool 80.

Tool 80 consists of three sections 70, 72 and 74 of various lengths and shapes of metal. Tool 80 also consists of seven threaded bolts, fourteen threaded nuts, two threaded wing nuts 60 and 61, a round rubber disc 21 that also carries a rubber pulley 22, a rubber pulley 26 with a metal band 27 and a spring 25 attached thereto, a round rubber belt 64, and a firm rubber band 10.

Section 70 is 9" long×1¼" wide×3/16" thick and is formed from a rectangular bar of steel stock.

Section 74 is 6" long and formed from angle iron measuring 1"×1" on each side. Section 74 serves four separate uses;

FIG. 1 shows section 74 in position for removing a valve.

Figure 4:
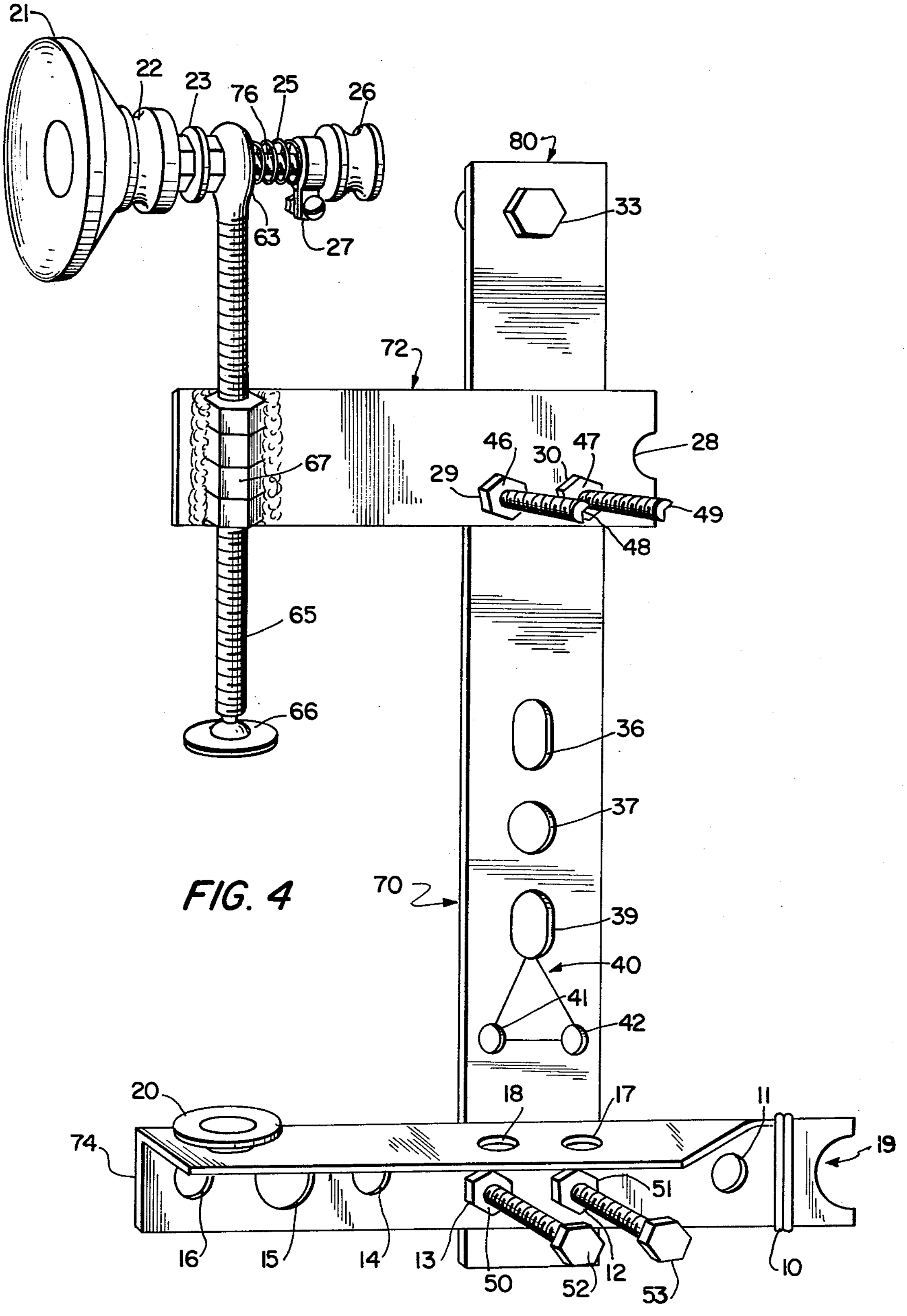
FIG. 4 is a side view of the adjustable combination lawn mower tool assembled for use as a "C" clamp.

FIG. 4 shows section 74 in position for clamp use.

Figure 5:
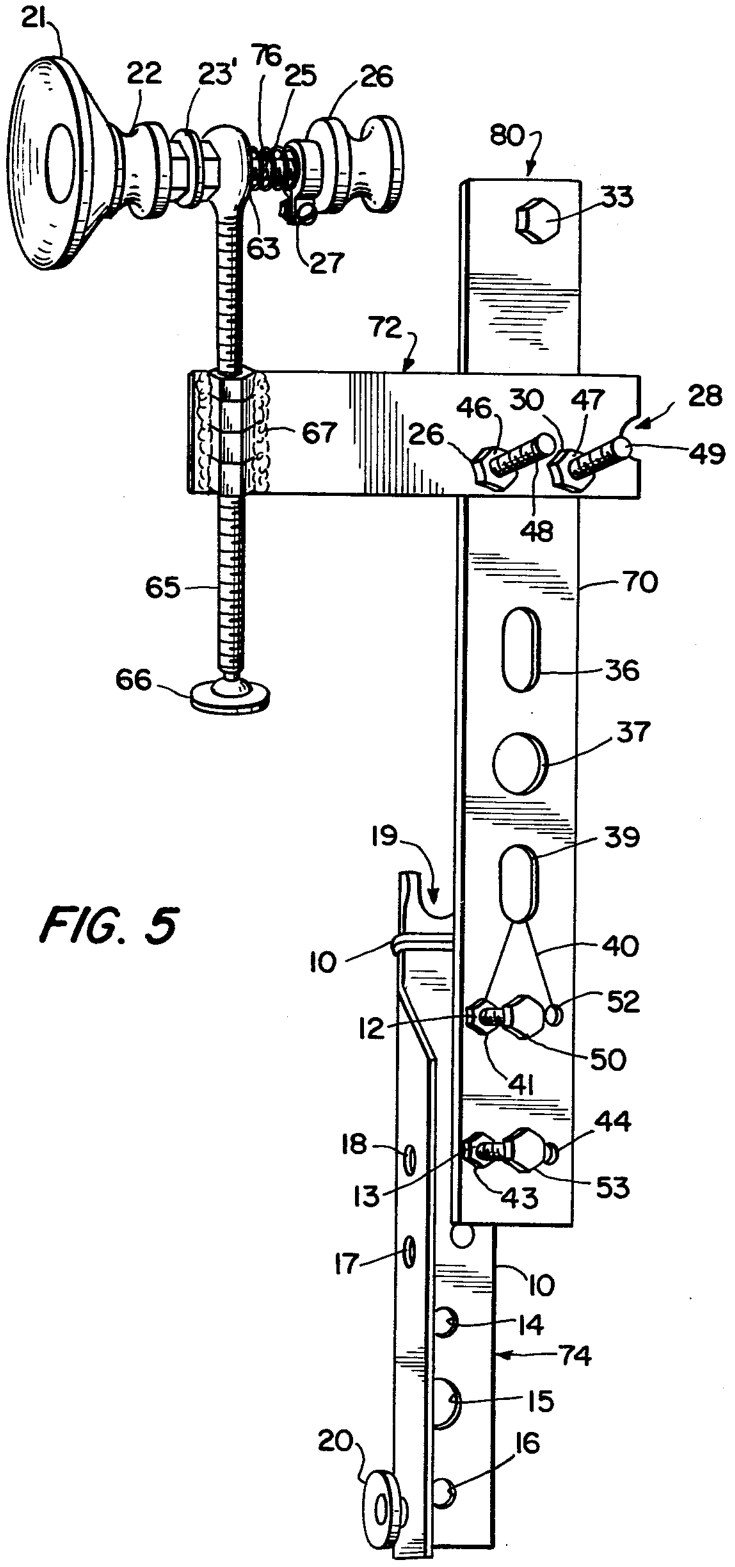
FIG. 5 is a side view of the adjustable combination lawn mower tool showing section 74 in position for use as an extension handle for wrench use.

FIG. 5 shows section 74 in position as an extension handle.

Figure 6:
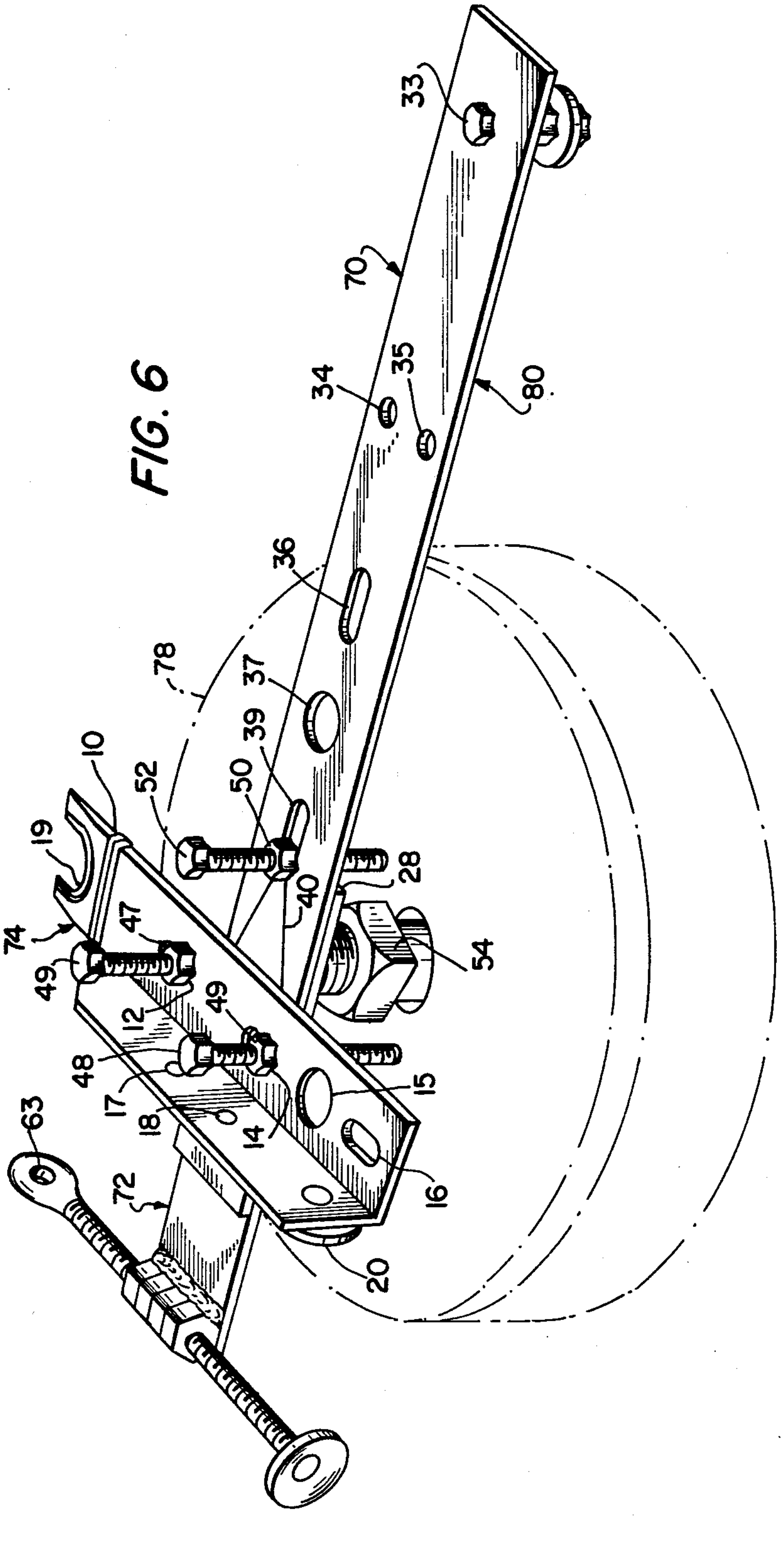
FIG. 6 is a perspective view of the adjustable combination lawn mower tool positioned for use as a flywheel puller for pulling flywheels provided with three holes arranged in a triangular array.

FIG. 6 shows section 74 in position for pulling a flywheel equipped with three holes, section 74 also serving for pulling flywheels carrying two holes as shown in U.S. Pat. No. 4,315,339.

Section 72, FIG. 1, is 4½" long, is formed from the same steel stock as section 70 and has four threaded nuts 67 secured on one end. Also a threaded torque bolt 65 is mounted into nuts 67 for applying torque for valve removing (FIG. 1) or for use as a "C" clamp (FIG. 4).

Also, a threaded handle bolt 76 is positioned through hole 63 at the upper end of torque bolt 65, FIG. 1, bolt 76 for one use serving as a handle and for a second use as a valve and valve seat grinding tool (FIG. 8) in combination with an electrical drill 75. Likewise belt 64 may be moved backwards and forwards manually.

Section 74 for removal of valves (FIG. 1) is secured to section 70 by placing self-threading bolts 52 and 53 into holes 17 and 18 in section 74; then through matching holes 41 and 42 (FIG. 3) in section 70; thus forming right angles. Bolts 52 and 53 are secured in position by nuts 50 and 51 and wing nuts 60 and 61.

In particular, as seen in FIG. 1, the tool 80 comprises the three sections 70, 72 and 74, which can be coupled in various different ways.

Section 70 is an elongated first bar with a rectangular cross section having a rectangular array of holes 41-44 at the bottom or second end, see FIGS. 3 and 4. Above these holes are an oval hole 39, a circular hole 37 and another oval hole 36, all aligned and along the central axis of section 70. Above oval hole 36 are a pair of transversely spaced holes 34 and 35, see FIG. 6, and above these holes is a suitable hole for the reception of the post 33 formed of a bolt, nuts and a washer at the first end of section 70. A triangular design 40 connects holes 39, 41 and 42.

Section 72 is an elongated second bar with a rectangular cross section having a cut out slot 28 at one end, a series of four aligned nuts 67 rigidly secured transversely thereof such as by welding near the opposite end and a pair of holes 29 and 30 axially spaced and located near the cut out 28. Section 72 is rigidly but releasably connected to section 70 at right angles via threaded bolts 48 and 49 which pass through holes 34 and 35 in section 70 and holes 29 and 30 in section 72, nuts 46 and 47 securing these bolts in place.

As seen in FIGS. 1, 2, 5 and 7, a threaded torque bolt 65 is threadedly received in nuts 67 and has an enlarged pressure washer 66 extending from one end. The other end has a threaded bore 63 for the threaded reception of a threaded handle bolt 76. At one end of bolt 76 is a round rubber disc 21, a pulley 22, a nut 22', washer 23' and nut 23. At the other end is another rubber pulley 26, a screw-closed metal band 27 and a coil spring 25. A rubber band 64 is engageable with pulley 22.

Section 74 is an angle iron and on one portion has an end with a semi-circular jaw cut out 19 and a series of aligned axially spaced holes 11–16. Hole 15 is larger than holes 11–13, all of which are circular. A rubber band 10 is wrapped around section 74 between cut out 19 and hole 11.

On the other portion of the section 74 there are holes 17 and 18, which are essentially in the same planes as holes 12 and 13, as well as a pressure washer 20 coupled thereto.

Section 74 is rigidly but releasably secured to section 70 at right angles by threaded bolts 52 and 53 which have threaded nuts 50 and 51 threaded thereon as well as threaded wing nuts 60 and 61. Bolts 52 and 53 pass through holes 17 and 18 in section 74 and through holes 41 and 42 in section 70. A large threaded nut 32 can be temporarily attached to tool 80 between section 70 and wing nut 60 on bolt 53.

Valve Pulling Use

As seen in FIG. 1, tool 80 can be used for valve pulling on a small engine, such as a lawn mower engine. To do this, jaw 19 is maneuvered between the valve spring and valve retainer and the threaded torque bolt 65 is rotated so that washer 66 bears against the top of the valve to elevate the valve spring upwards for removal of the valve retainer and valve. In valves that use a pin retainer, both the washer and spring can be elevated, thereby freeing the pin for removal of the valve retainer and valve.

To replace a valve and valve spring, the retainer and spring are positioned to fit against jaw 19. Then the retainer and spring are temporarily secured to fit against jaw 19 using a firm rubber band 10. Thus band 10 is positioned around and against the spring and retainer and likewise positioned around section 74; thus temporarily securing the spring and retainer against jaw 19.

Then the retainer and spring are inserted into the engine valve chamber; likewise the retainer for the valve stem is positioned to fit into the large hole of the retainer slot; then valve stem 59 goes all the way down, and valve top 57 fits flush with the top of the engine.

Then, the torque bolt pressure washer 66 is positioned to fit against the top of the valve 57.

Next, the torque bolt 65 is turned clockwise to elevate the retainer and spring, until the retainer lines up with cut out shoulder 69 on the valve stem 59. Then the retainer is positioned so the small retainer hole centers on the cut out shoulder 69 on the valve stem 59. Then tool 80 is removed, thus seating retainer and spring into position.

C-Clamp Use

FIG. 4 shows a side view of tool 80 for use as a C-clamp. Clamp use is not a part of my prior U.S. Pat. No. 4,315,339.

However, by adding holes 12 and 13 (FIG. 1) into one side of section 74 (FIG. 1); and likewise adding a pressure washer 20 (FIG. 4) on the far end of section 74, tool 80 can form a C-clamp for general shop use.

Section 74 and section 70 are coupled by placing self-threading bolts 52 and 53 into holes 12 and 13 of section 74; likewise into holes 43 and 44 (FIG. 1) of section 70, and securing bolts 52 and 53 using nuts 50 and 51 and wing nuts 60 and 61 (FIG. 1).

To provide a clamp with a smaller opening, holes 41 and 42 in section 70 may be used. Likewise, for a smaller clamp, other holes could be provided in section 70.

Starter Clutch Housing Removal

FIG. 5 shows a side view of tool 80 showing section 74 in position for use as an extension handle to provide leverage for wrench use for removing or replacing the starter clutch housing common on most Briggs & Stratton lawn mower engines.

Thus section 74 is secured to the end of section 70 by placing self-threading bolts 52 and 53 into holes 41 and 43 in section 70; and into matching holes 12 and 13 in section 74 using nuts 50 and 51 on one side of section 70 and using wing nuts 60 and 61 (FIG. 1) on the opposite sides of section 70. For wrench use tool 80 remains the same as shown in U.S. Pat. No. 4,315,339 except section 74 is constructed from an angle iron instead of a rectangular bar.

Flywheel Pulling

FIG. 6 is a perspective view of tool 80 in position for pulling a flywheel 78, this flywheel 78 being equipped with three holes spaced two inches apart in a triangular pattern. This three-hole configuration is a common flywheel design.

To accomplish the flywheel removal, the following is done:

First separate section 72 and section 74 from section 70; thus freeing the self-threading bolts and nuts. Next, loosen nut 54 holding down flywheel 78, thus creating a space for upwards movement of flywheel 78.

Next hold section 70 with post end 33 pointing towards the operator and likewise with triangular design 40 pointing towards the operator; then place design 40 on top of loosened nut 54; thus lining up hole 39 in section 70 with a matching hole in the flywheel 78; then position self-threading bolt 52 through hole 39 in section 70 and thread into the matching hole in the flywheel 78; next, for a double thickness of steel, shove section 72 under section 70; thus cut out 28 will straddle bolt 52; likewise section 72 will rest on said nut 54.

Next place section 74 across section 70 and section 72, thus aligning holes 12 and 14 in section 74 with matching holes in the flywheel 78; then position self-threading bolts 48 and 49 into holes 12 and 14 in section 74 and thread bolts 48 and 49 into matching holes in the flywheel 78. Next alternately thread down clockwise pressure nuts 46, 47 and 50 on these bolts until the flywheel 78 moves upwards. The tool remains the same as shown in U.S. Pat. No. 4,315,339 for pulling Briggs & Stratton flywheels carrying two holes except angle iron 74 replaces the rectangular bar for a double thickness of steel.

Valve Grinding

FIG. 7 is a side view of the valve grinding tool which is carried by, but separable from, tool 80.

Round rubber disc 21 is a combination grinding disc and pulley 22.

Round rubber pulley 26 is a pulley with spring 25 attached thereto via a metal band and a threaded nut and bolt 27 for securing pulley 26 onto the valve stem 59 (FIG. 8).

Thus pulley 26 is normally lightly threaded onto handle bolt 76 to thereby hold bolt 76 in position for use as a handle; therefore, for removal of bolt 76 for use as a valve grinding tool, pulley 26 is unthreaded and handle bolt 76 is placed into the chuck of a speed drill 75 (FIG. 8).

For one of two ways to grind the valves and valve seat, disc 21 may be positioned on top of the valve mainly to the outside edge, thus the spinning speed drill spins said disc 21 causing friction against the top of the valve; likewise spinning valve for valve grinding as shown in U.S. Pat. No. 4,315,339. The present improvement provides a second procedure for valve grinding, especially deep seated valves that are difficult to spin as shown in FIG. 8.

To accomplish this, place pulley 26 with spring 25 attached thereto into the engine valve chamber opening; then shove the valve stem 59 into the spring opening and into a center hole in pulley 26.

Next adjust pulley 26 so spring 25 fits lightly against the engine block 68; then tighten the bolt and nut on metal band 27, thus securing pulley 26 onto the valve stem 59, and thus exerting a slight pressure between the valve face 57 and valve seat 58 for proper valve grinding using a valve grinding compound. Next position bolt 76 into the chuck of a speed drill 75, then place round rubber belt 64 onto pulley 22 and pulley 26. Thus the spinning speed drill 75 causes valve stem 59 to spin, grinding the valve and valve seat. However, if a speed drill is not available the belt 64 may be pulled forwards and backwards manually, likewise grinding the valves and valve seat.

FIG. 9 is a top view showing round rubber belt 64 in a crossed position, thus reversing the spinning direction of the valve for best valve grinding results, belt 64 often being used on sewing machines. This crossed belt position is unnecessary if speed drill 75 is equipped with a reverse switch.

While one advantageous embodiment has been chosen to illustrate the invention, it will be understood by those skilled in the art that various changes and modifications can be made therein without departing from the scope of the invention as defined in the appended claims.

What is claimed is:

1. An adjustable combination tool comprising:

an elongated first bar;

a projection extending from one side thereof;

a second bar coupled to said first bar perpendicular thereto and at a predetermined position from said projection;

said projection, in cooperation with said second bar, providing a wrench-like coupling with a starter clutch housing on a small gasoline combustion engine when placed on top thereof for removing or tightening the same;

an angle iron;

means for coupling said first bar and said angle iron in a first position in which said angle iron is perpendicular to said first bar and a second position in which said angle iron is parallel to and extending from said first bar;

a threaded bolt having an enlarged end; and means for threadedly coupling said threaded bolt to said second bar, said first bar, second bar and angle iron forming a C-shaped clamping device when said angle iron is in said first position in which said enlarged end of said bolt and a part of said angle iron form opposed clamping surfaces, said angle iron forming an extension of said first bar for use as a wrench handle extension when said angle iron is in said second position.

2. A tool according to claim 1, wherein said angle iron comprises first and second perpendicular portions, said means for coupling said first bar and said angle iron in said first position includes means for engaging either said first or second portions thereof so that said angle iron can be used as part of a clamping device and as part of a valve pulling device.

3. A tool according to claim 2, wherein said angle iron has a cut out at one end for engaging a valve in a small gasoline engine.

4. A tool according to claim 1, and further comprising a handle, means on said threaded bolt for supporting said handle perpendicular to said threaded bolt.

5. A tool according to claim 4, wherein said handle has a rubber disc at one end.

6. A tool according to claim 4, wherein said handle has a pulley supported thereon.

7. An adjustable combination tool comprising:

an elongated first bar;

a second bar;

means for selectively coupling said second bar in a first position perpendicular to said first bar adjacent a first end thereof and in a second position parallel to and extending from a second end of said first bar;

an angle iron;

means for coupling said angle iron perpendicular to said first bar adjacent said second end; and means on said first bar and said angle iron for receiving three threaded bolts in a triangular array for use in removing flywheels from engines.

8. A tool according to claim 7, and further comprising a projection extending from said first end of said first bar.

9. A tool according to claim 7, and further comprising a threaded torque bolt, and means on said second bar for threadedly supporting said torque bolt.

10. A tool according to claim 7, wherein said angle iron has a cut out at one end.

* * * * *